Dec. 1, 1959  H. BLEIBTREU  2,915,020
RUNNING GEAR FOR RAILROAD VEHICLE
Filed March 28, 1955  3 Sheets-Sheet 1
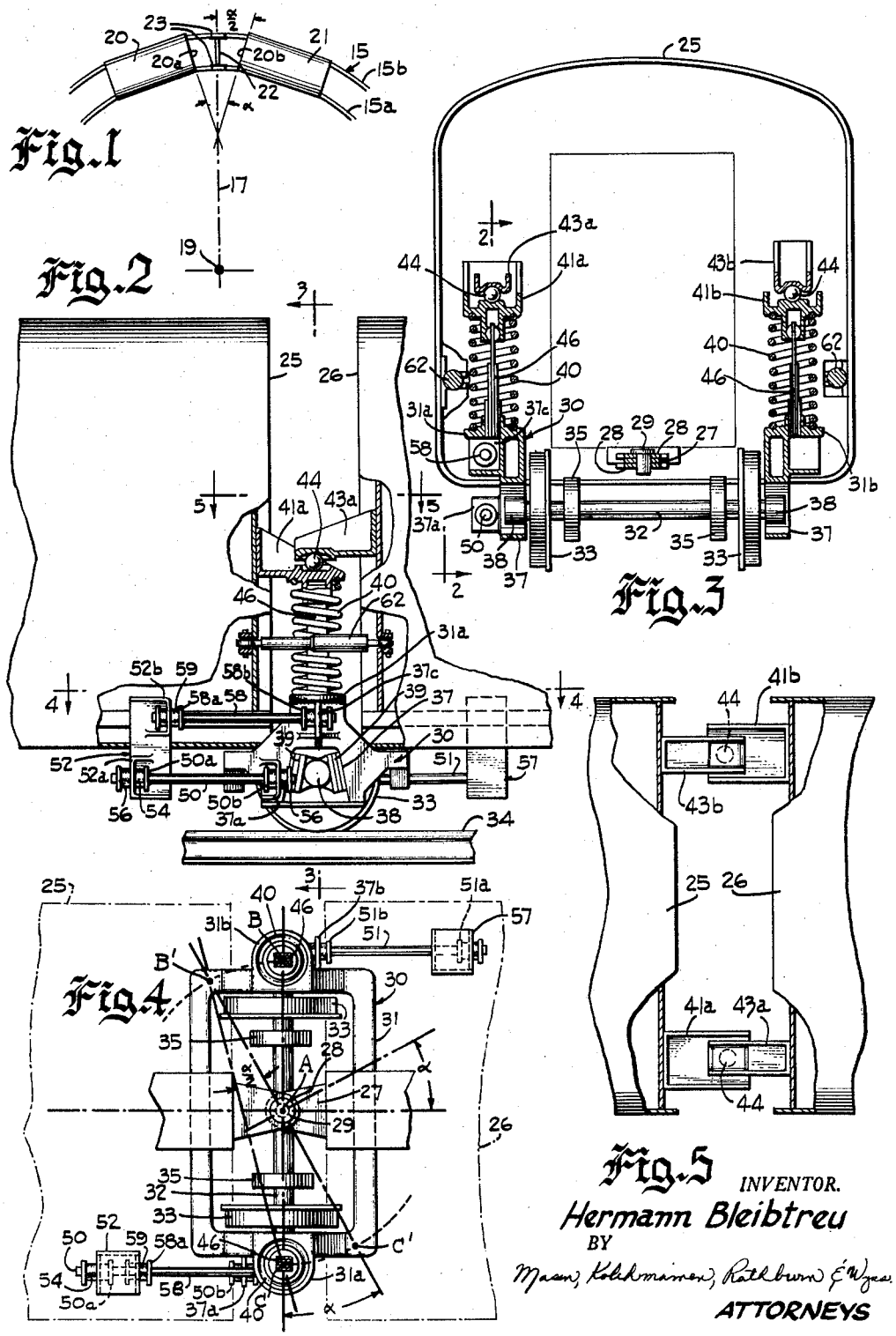
INVENTOR.
Hermann Bleibtreu
BY
Mason, Kolehmainen, Rathburn & Wyss
ATTORNEYS Dec. 1, 1959   H. BLEIBTREU   2,915,020
RUNNING GEAR FOR RAILROAD VEHICLE
Filed March 28, 1955   3 Sheets-Sheet 2

INVENTOR.
*Hermann Bleibtreu*
BY
Mason, Kolehmainen, Rathburn & Wyss
ATTORNEYS

Dec. 1, 1959     H. BLEIBTREU     2,915,020
RUNNING GEAR FOR RAILROAD VEHICLE
Filed March 28, 1955     3 Sheets-Sheet 3

INVENTOR.
*Hermann Bleibtreu*
BY

ATTORNEYS.

UNITED STATES PATENT OFFICE 2,915,020
Patented Dec. 1, 1959

2,915,020

RUNNING GEAR FOR RAILROAD VEHICLE

Hermann Bleibtreu, Hinsdale, Ill.

Application March 28, 1955, Serial No. 497,203

11 Claims. (Cl. 105—4)

The present invention relates to a running gear for railroad vehicles, and and more specifically to a single axle running gear for railway passenger cars, wherein a single axle may be employed to support the adjacent ends of two railway passenger cars.

The railroad industry has found in recent years that a real problem is presented with respect to its passenger service. The automobile and the airlines have cut tremendously into the passenger business of the railroad. Railroad officials, for quite a number of years, have shrugged this off and have been more or less satisfied with the freight business and other business available to them, but more recently they have taken a more careful look at the potentialities of a profit-making passenger business, and it is the general feeling that, with light, high-speed equipment having fine riding qualities, the railroad passenger business might become very much more important than it now is.

The conventional railroad passenger cars are essentially of two types. One type of railroad passenger car is commonly referred to as the long swivel truck type. In this type of car, two trucks are provided, each of which may have two or three axles, and these trucks are disposed in spaced relationship with the car bodies resting on the trucks, generally one truck being provided at each end of the car. These trucks are provided with center plates, and the ends of the car bodies are pivoted to the center plates. It will be apparent that when the car body goes around curves, the trucks will swivel relative to the car body. This swivel motion is produced by the guiding action of the rails on the rims or flanges of the wheels. The riding qualities of this type of car are not very satisfactory and it is difficult to prevent the transmission of all sorts of shock to the car body. It will also be apparent that this type of passenger car having two trucks at each end of the car, with each truck having at least two axles, results in a construction in which a minimum of four axles per car are required. Trucks of this nature are heavy and, obviously, it is difficult to make a lightweight car with this sort of construction, so that to produce a lightweight car it is essential to get away from the constructon of two trucks with several axles each per car. As a result, this type of car body is considered to be relatively unsatisfactory for modern railway passenger service.

Another type of passenger car is what is known as the short, two-axle car. The axles are held in pedestals which are a part of the superimposed car body. This provides a rigid wheel base which prevents the axles from swiveling in regard to the car body and, as a result, when going around curves, there is excessive wear and resistance between the wheel rim and the rail. For this reason passenger cars of this type have wheel bases which seldom exceed twenty to twenty-eight feet. Obviously, if the car is sufficiently short, then the friction problem is not very acute. Attempts have been made to decrease the resistance between the car wheels and the rails when going around curves by giving the axle freedom to swivel, thereby hoping it will remain on the radius of the curve of the railroad track. This has proved fallacious.

To meet the ever increasing demand for lighter cars with a lower weight per seat or a lower weight per foot of car length, a few trains have been built, which might be referred to as single-axle cars, each car having only a single axle. These cars were constructed so that the front end of one car rests on the rear end of the car just ahead of it, while the rear end of the car rests on a running gear consisting of a single axle. In this construction the single axle was supported so that no swivel motion of the axle in regard to the car body could take place. Consequently, the resistance produced by such cars, insofar as the wheel flanges engaging the track is concerned while going around a curved track, has made it necessary to limit the lengths of these cars to a maximum of twenty-eight feet. Moreover, it has been found that these trains can run in only one direction, namely, the direction in which the axles are on the trailing end of the cars. If the train is run so that the cars are moved in the opposite direction with the axles on the leading end of the car, the wheel rim on the rail which is on the outside of the curve tends to grind against the inside of the outer rail at an angle which is large enough to cause binding.

To overcome the weakness of these light cars and to permit the building of longer and, therefore, more economical cars, there has very recently been suggested a lightweight train in which adjacent cars are supported by single axle trucks which are placed between these cars and which trucks are guided by mechanical means so that the axle assumes what may be termed a "radial" position when going around a curve. When referring to "radial" position hereinafter, it is intended to refer to that position of the axle of the car which is parallel to the radius of the curve of the track upon which the car is traveling. If the axle is maintained in this radial position, curve resistance is reduced to a minimum, thereby permitting satisfactory operation of the train in both directions. With this arrangement cars forty feet in length can be employed without the frictional problem when going around curves. Unfortunately, the means which have been suggested to cause the axles to maintain such radial position have been very complicated, and the riding qualities of these cars have been unsatisfactory. Furthermore, the safe speed of these cars has been relatively low. It would be desirable to provide an improved running gear for railway passenger cars which insures that the axles are guided to remain in this radial position when the train is traveling around a curve, thereby greatly to reduce the friction and at the same time to provide a very simple arrangement for accomplishing this, resulting in a car with excellent riding qualities and high, safe speed. It is also desirable in such an arrangement to insure that supporting springs or the like remain in their proper supporting position without sway or the like.

Accordingly, it is an object of the present invention to provide a new and improved railway car.

It is another object of the present invention to provide a new and improved running gear for a railway passenger car.

It is still another object of the present invention to provide a new and improved running gear for a railway passenger car which results in better riding qualities and higher safe speed for the car, thereby providing a car having a minimum weight per foot of length and, consequently, a minimum weight per seat provided in such trains.

Still a further object of the present invention resides in a new and improved running gear and improved supporting means for supporting railway passenger cars from such running gear.

Further objects and advantages of the present invention will become apparent as the following description proceeds and the features of novelty characterized by the invention will be pointed out with particularity in the claims annexed to and forming a part of this specification.

For a better understanding of the present invention reference may be had to the drawings in which:

Fig. 1 is a schematic diagram of a curved track section, a pair of cars and associated running gear, with the curve somewhat exaggerated in order better to understand the present invention;

Fig. 2 is an elevational view, with various parts cut away, and with a somewhat schematic representation of an improved running gear illustrated as disposed between two adjacent ends of railway passenger cars;

Fig. 3 is a sectional view taken on line 3—3 of Fig. 2, assuming that Fig. 2 shows the complete construction, and again being somewhat schematic in disclosure in order to simplify the drawings;

Fig. 4 is a sectional view taken on line 4—4 of Fig. 2, again assuming that Fig. 2 shows the complete structure;

Fig. 5 is a sectional view taken on line 5—5 of Fig. 2, eliminating many of the elements which would ordinarily be seen in order to simplify the drawings, primarily to illustrate how one car is supported on the adjacent car;

Figure 6:
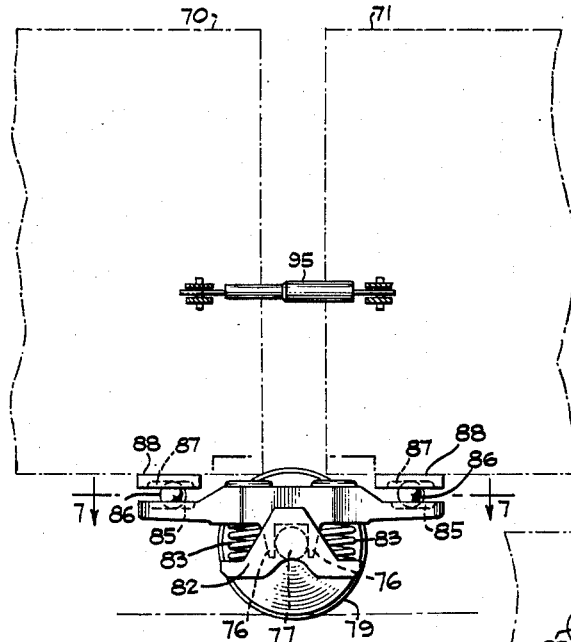
Fig. 6 is a view somewhat similar to Fig. 2, also to some extent schematic in representation, illustrating a modification of the present invention with certain portions omitted to simplify the drawings.

Before describing in detail the specific embodiments of the present invention, consideration need first be given to the kinematics by which radial positioning of a single axle truck is obtained. Obviously, as long as the axle is pointing along the radius of the curve of the track, it means that the wheels supporting the axle are effectively tangent to the curve of the rail, thereby insuring that the wheels are guided along the track in a manner so that the wheel flanges do not bind against the edges of the rails. It will be apparent that as a train goes around a curve, the adjacent ends of the cars are disposed at an angle to each other. If the axle is disposed on a plane equidistant between the cars when the car ends are parallel to each other, then if the longitudinal axis of the axle bisects the angle defined by the adjacent car ends relative to each other, the axle should be on the radius of the track curve or the "radial" position. Thus, if the axle turns through an angle which is one-half the angle by which the two cars turn in regard to each other, the desired positioning thereof to prevent binding and friction when going around curves is obtained. Referring now to Fig. 1 of the drawings, there is illustrated a railroad track, generally designated at 15, comprising the conventional parallel rails 15a and 15b. The section of track 15 illustrated in Fig. 1 is a curved section of track and the radius of the curve is represented by line 17, with the center of a circle having that radius designated by the point 19. Schematically illustrated in Fig. 1 are a pair of adjacent railroad cars 20 and 21. If the cars 20 and 21 were disposed on a straight section of track, the adjacent ends thereof, designated as 20a and 20b, respectively, would be parallel. However, since these cars are illustrated as being disposed on a curved section of track, the adjacent ends 20a and 20b are disposed at an angle with each other, which is designated by the angle $\alpha$ in Fig. 1 of the drawings. Also schematically illustrated in Fig. 1 of the drawings is an axle and associated wheels, in which the axle is designated by the reference numeral 22, and the wheels are designated by the reference numeral 23. This axle is disposed between the two cars 20 and 21, and if the cars were on a straight section of tracks with their adjacent ends 20a and 20b parallel, the axle 22 would obviously be parallel with the car ends. It will be obvious that if the axle 22 or the axis of the axle 22 bisects the angle $\alpha$, or, in other words, if a mechanism is provided to move the axle 22 through an angle $$\frac{\alpha}{2}$$

equal to half the angle through which adjacent car ends move, the axle will be maintained in the radial position. The present invention is concerned with improved means for insuring that this occurs, whereby the axle is maintained coaxial with the radius of the track curve and, hence, friction is maintained at a minimum.

Referring now to Figs. 2, 3, 4 and 5 of the drawings, there is illustrated one embodiment of the present invention involving an improved running gear for passenger cars which is simple and compact, and which permits a construction very light in weight and satisfactory at high-speed operation of the train employing the cars. Also, the supporting springs remain vertical regardless of the car position. As illustrated in the drawings, portions of two adjacent cars are shown, designated by reference numerals 25 and 26, respectively. These cars are somewhat schematically shown and may have any desired configuration. They are illustrated as having connected to the frames thereof at the adjacent ends suitable coupling members, designated as 27 and 28, respectively, whereby the car bodies 25 and 26 are coupled together by means of a coupling pin 29 extending through aligned openings in coupling members 27 and 28. This arrangement permits the individual car bodies to move relative to each other about the pivot or coupling pin 29. The coupling members or couplers 27 and 28 are located at or below the floor level of the cars, as is best shown in Fig. 3 of the drawings.

For the purpose of supporting the adjacent ends of the car bodies 25 and 26, there is provided a truck, designated generally at 30, comprising a frame, generally designated at 31, described in greater detail hereinafter, with which there is associated a single axle 32 having suitably supported thereon the conventional railroad wheels 33 for supporting the truck 30 on a track such as 34, best shown in Fig. 2 of the drawings. The axle 32 is schematically illustrated as having associated therewith a pair of brake drums 35, whereby braking torque may be applied to the axle 32 for stopping the train in which the cars comprising car bodies 25 and 26 are disposed.

The truck frame 31 is illustrated as a rectangular frame provided at the ends with pedestals 37, which unlike the conventional pedestals are wider at the bottom than at the top. Disposed within the pedestals are journal boxes 38, which are supported within the pedestals by interposed layers of rubber and metal, as best shown in Fig. 2 of the drawings. These are commonly referred to as rubber sandwiches and are generally designated in the drawings by the reference numeral 39, one sandwich being provided on either side of the journal box. These sandwiches are secured to the journal box and the pedestal, respectively, and act as a sort of spring support between the journal box and the pedestal. They act as a spring under shear as far as vertical and lateral forces are concerned, while the horizontal forces lengthwise of the sandwiches are taken up with practically no play, the rubber layers being in compression. The pedestals 37 are found to be very satisfactory, but it should be understood that the present invention is also applicable to running gear where conventional pedestals involving parallel sides are employed, as will become apparent from the ensuing description.

To support the car bodies 25 and 26 from the truck 30, the truck frame 31 is provided with integral means at either end thereof defining spring seats 31a and 31b to support the lower ends of coil springs 40, one coil spring being provided on each seat 31a and 31b. The supports or seats 31a and 31b are especially designed to accommodate the coil springs 40, as is clearly evident from Fig. 3 of the drawings.

Another feature of the present invention is that the coil springs 40 remain vertical and their upper and lower ends are maintained in a fixed position except for relative vertical movement thereof. To this end, the car body 25 is illustrated as having secured thereto a supporting bracket 41a at one side thereof directly above spring seat 31a and is provided on its under surface with means to accommodate the upper end of the coil spring 40. Thus one side of the car body 25 is supported from truck 30 by the bracket 41a secured thereto and the associated coil spring 40. In a similar manner there is secured to the car body 26 a bracket 41b identical to the bracket 41a but disposed on the opposite side of the car when the adjacent car ends are in the positions disclosed in the drawings so as to be directly above the spring seat 31b for accommodating the upper end of associated coil spring 40. The brackets 41a and 41b are actually all located on the same side of the car bodies when viewed with the corresponding car ends orientated in the same direction. With such an arrangement there is no question involved in making up a train. As illustrated in the drawings, the brackets 41a and 41b are secured to the left side of each car body when viewing each car from the same direction. Obviously they could all be on the right side, if desired. Thus one side of the car body 26 (opposite from the supported side of car body 25) is supported from truck 30 by bracket 41b and associated coil spring 40. To support the side of car body 25 opposite from that to which bracket 41a is secured, there is provided a bracket 43b secured thereto in any suitable manner and disposed immediately above bracket 41b. A similar bracket 43a is attached to the car body 26 immediately above bracket 41a, as is clearly obvious from Figs. 3 and 5 of the drawings. The brackets 43a and 43b are adapted to be supported on the brackets 41a and 41b, and the load is transmitted therebetween through spherical members 44 which may be formed of steel, rubber, or other suitable material. To accommodate the spherical members 44, the cooperating portions of brackets 41a and 41b on the one hand and brackets 43a and 43b on the other hand are provided with suitable cooperating recesses.

To provide a safe ride at high speeds and to minimize the effect of external forces, the tops of the springs 40 are preferably disposed the same distance above the rails 34 as are the centers of gravity of the car bodies 25 and 26. Thus all lateral forces, due to centrifugal action or lateral unevenness of the tracks, are transmitted between both car bodies 25 and 26 and springs 40 without imparting to the car bodies tilting movements, which results in greatly improved riding qualities.

In many cases, the lateral resistance of the coil springs 40 is sufficient to overcome any lateral forces that are involved. If desired, however, an increased lateral resistance may be obtained by the provision of a leaf spring such as 46, one associated with each of the coil springs 40. As illustrated, the lower end of each leaf spring is fastened to the truck frame 31 at the center of spring seats 31a or 31b in any suitable manner, and each comprises a plurality of leaves, the largest of which is received within a suitable opening in the associated bracket such as 41a or 41b, as indicated in Fig. 3 of the drawings. Sufficient space is provided to permit relative vertical movement between the leaf springs 46 and the brackets 41a and 41b. Thus the leaf springs 46 will increase the lateral force provided by the coil springs 46. It will be appreciated that increased lateral resistance can also be provided by means other than the leaf springs 46. For example, a rigid column may be disposed where leaf springs 46 are disposed in Fig. 3, which may be provided adjacent the upper end thereof by a rubber collar or the like which, in the event of sufficient lateral sway of the coil springs 46, will bear against the inner surface of the coil springs to limit the maximum sway.

In accordance with the present invention and for the purpose of insuring that the axis of the axle 32 remains on the radius of the track curve, each end of truck 30 is connected to a different one of the car bodies 25 and 26. Thus the end of car body 25 adjacent car body 26 is connected by a suitable rod 50 with the truck frame 31 at that side of the car. A similar rod 51 is provided for connecting the other end of the truck frame 31 with the car body 26. To accomplish this, the frame of the car body 25 has secured thereto a member 52 provided with a lateral flange 52a or a similar arrangement to permit ready connection of the rod 50 thereto. As illustrated in the drawings, the end of the frame 31 having the spring seat 31a is provided with a projecting flange 37a to provide ready means for connecting the rod 50 thereto. As illustrated, the rod 50 is provided with flanges 50a and 50b to support in fixed position thereon resilient washers, such as rubber washers 54. Actually, four such washers 54 are provided on the rod 50, one on either side of the flange 52a, and one on either side of the flange 37a. Suitable end caps such as 56 are provided at each end thereby positively to interconnect the flanges 52a and 37a with rod 50. The rubber washers 54 provide a means for taking up all forces acting between the truck frame 31 and the car body 25 directed in a longitudinal direction along the track. This is done without any play and yet sufficient freedom of motion between the car body 25 and the truck frame 31, both in a vertical direction and also crosswise, is permitted. The rod 51 on the other side of the frame 31 associated with the car body 26 is preferably identical with the rod 50, particularly with respect to its connection to the frame 30 and the car body 26. As illustrated in Fig. 4 of the drawings, a support 57 secured to the frame of the car body 26 is provided. This support 57 may be identical with the support 52 described above. Frame 31 is also provided with a projecting flange 37b on the end remote from flange 37a. The rod 51 has the flanges 51a and 51b identical with flanges 50a and 50b described above, and the same washers 54 are employed. It will be appreciated that the side of car body 25 to which bracket 41a is secured is linked to truck frame 31 by rod 50. Thus, regardless of the angular position of car body 26, the lower seat 31a for spring 40 remains directly below the seat defined in bracket 41a. The same is true with respect to the bracket 41b and car body 26. Thus, relative angular movement between car bodies 25 and 26 will in no way cause springs 40 to move out of their vertical positions. This is an important feature of the present invention.

It will be appreciated that when car bodies 25 and 26 are on a straight section of track, their longitudinal axes are colinear, thus forming an angle of 180° therebetween. The axle 32 will be in the desired radial position if it bisects this angle or is disposed at 90° with respect to these longitudinal axes, which for a straight track section means that the axle 32 is perpendicular to the track rails 34. There has been described above a simple mechanism which insures that the axle 32 always bisects the angle between the longitudinal axes of the car bodies 25 and 26. Thus, if the angle through which the axle 32 turns is one-half the angle by which the car bodies turn relative to each other, this desirable radial positioning of the axle 32 will be maintained. To understand that this kinematic condition exists with respect to the arrangement of Figs. 2 to 5 of the drawings, the vertical axis of the coupling pin 29 in Fig. 4 of the drawings has been designated as point A, the center of spring seat 31b, which is effectively the point where link or rod 51 connects one side of car body 26 to frame 31, has been designated as point B, and the center of spring seat 31a, which is effectively the point where rod or link 50 connects truck frame 31 to the opposite side of car body 25, has been designated as point C. On a straight track, line BC will be bisected at A by the longitudinal axes of car bodies 25 and 26. Suppose now the connected car bodies 25 and 26 enter a curve and car body 26 turns about point A (counterclockwise, as viewed in Fig. 4 of the drawings) through an angle α relative to car body 25, it being assumed that car body 25 remains in the position shown in Fig. 4. Effectively, then, line B'AC', a line parallel to the end of the new position of car body 26, makes an angle α with the line BAC. By virtue of rod 50, however, as far as truck frame 31 is concerned, point C does not move, since we have assumed that car body 25 remains in the position shown. Hence, truck frame 31 pivots about point C so that the axle 32 effectively moves to the position of line B'C, which from the geometry of the dashed lines superimposed on Fig. 4 of the drawings, clearly is an angle $$\frac{\alpha}{2}$$

In order to transmit the brake torque from the brake drums 35 to the truck frame 31, and from the truck frame 31 to the car bodies 25 and 26, there is provided a third rod 58 interconnecting the support 52 with the adjacent end of the truck frame 31, as is clearly indicated in Fig. 2 of the drawings. The rod 58 is preferably parallel to the rod 50 and of the same length, whereby the truck frame 31 is free to move vertically relative to the car bodies 25 and 26. The rod 58 is also provided with flanges 58a and 58b, and one end is attached to a flange 52b on the support 52 with interposed flexible washers 59, while the other end is secured to a flange 37c on the end of the truck frame 31 with similar interposed washers 59 which provide means for taking up the stresses without play. With this arrangement only three rods such as 50, 51 and 58 are required to maintain the axle along the radius of the curve around which the car bodies move or in the radial position, and also transmit the brake torque properly to the respective car bodies 25 and 26.

For the purpose of preventing horizontal oscillations of the car bodies 25 and 26 about the coupling pin 29, there are provided suitable damper means such as 62, one disposed on either side of the car bodies 25 and 26 and interconnecting the adjacent ends of the car bodies. Preferably the members 62 are in the form of telescoping hydraulic stabilizers.

In view of the detailed description included above, the operation of the running gear described above will readily be understood by those skilled in the art. It will also be appreciated that, although the present invention has been described as embodying a single axle 32 having rigidly connected thereto wheels 33, the construction might be one in which each car wheel is rotatable individually in the manner of the front wheels of an automobile or the like. In either case, the axes of the wheels would be maintained in the radial position whether the radius of the track section is infinite (straight track section) or finite (curved track section). Regardless of the relative angular position of the longitudinal axes of the car bodies 25 and 26, the supporting springs 40 will remain vertical in view of the arrangement described above.

Figure 7:
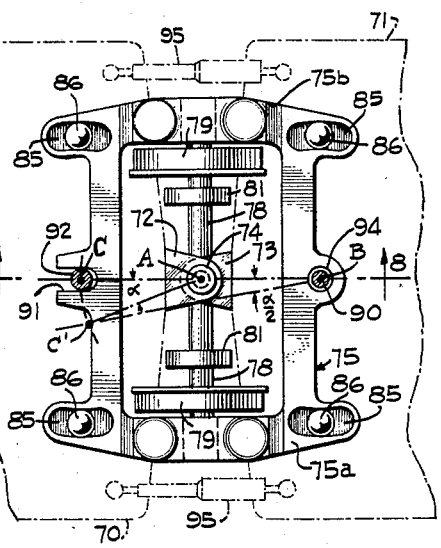
Fig. 7 is a sectional view taken on line 7—7 of Fig. 6.
Figure 8:
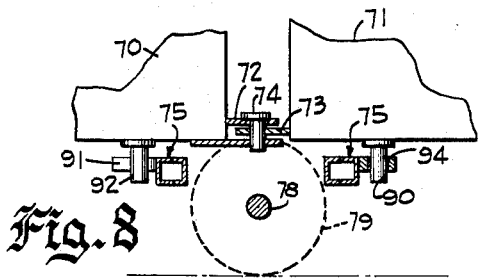
Fig. 8 is a sectional view taken on line 8—8 of Fig. 7, again omitting certain portions thereof for the purpose of simplifying the drawings.

The present invention is also applicable to a running gear in which the more conventional type of truck frame and pedestal with interposed springs are employed, and in Figs. 6, 7 and 8 of the drawings there is illustrated a modification of the present invention embodying a running gear of the more conventional type with respect to the truck frame and pedestal. As there illustrated, the adjacent ends of interconnected passenger cars comprising car bodies 70 and 71 are schematically illustrated. These car bodies are connected together by conventional couplers 72 and 73 pinned together by the coupling pin 74 in a manner very similar to the arrangement disclosed in the preceding embodiment. Preferably, the coupling means interconnecting the car bodies 70 and 71 are located at or below the floor level of the passenger car as comprising car bodies 70 and 71.

For the purpose of supporting the car bodies 70 and 71, there is provided a truck frame, generally indicated at 75, which is adapted to be disposed beneath the car bodies with the center of the truck frame equally dividing the space between the adjacent ends of the car when the car ends are parallel to each other. The truck frame is of the rectangular type having a longitudinal frame member 75a at one end thereof and a longitudinal frame member 75b at the other end thereof. These cross frame members 75a and 75b are provided with conventional pedestals 76 in which a journal box such as 77 can freely move up and down. Rotatably mounted in the journal boxes 77 is the conventional wheel and axle mechanism comprising the axle 78 with the associated wheels 79. The conventional brake drums 81 are also illustrated.

In order that the truck frame may be supported in a resilient manner upon the axle 78, there is secured to each journal box an equalizer bar or support member 82 between the ends of which and each truck end 75a and 75b of the frame 75 suitable coil spring members 83 are provided. These springs permit the truck frame 75 to move up and down freely with the spring deflections and thereby absorb shocks which might be transmitted from the wheels 79 to the truck frame 75.

For the purpose of supporting the car bodies 70 and 71 from the truck frames, the truck frame is provided at each of its four corners on the upper surface thereof with arcuate elongated recesses 85, which recesses are each adapted to receive a suitable supporting spherical member or ball such as 86, preferably formed of steel or rubber. The balls 86 are adapted to be partially received within similar somewhat arcuate receses 87 in support members 88 secured to the bottom of car bodies 70 and 71 immediately above the balls 86 effectively to be superimposed over the recesses 85. By virtue of the arcuate recesses 85 and corresponding recesses in the frame 75 and supports 88, respectively, the car bodies 70 and 71 may move relative to the truck frame 75 by pivoting about the coupling pin 74 to the extent necessary when negotiating a curve in the track. It will be appreciated that with four balls 86 a four-point support is provided. If a three-point support is desired, the recesses 85 on one side might be combined into a single centrally located recess using a single ball for supporting one of the cars.

For the purpose of insuring that the axis of the axle 78 remains on the radius of the curve of the track or in radial position, the truck frame 75 is pivotally connected to the car body 71 as by the trunnion 90, thereby providing a fulcrum about which car body 71 pivots relative to the truck frame 75. Similarly, truck frame 75 is provided with an elongated slot 91 for receiving the trunnion 92 secured to the car body 70, thereby providing a fulcrum for the car body 70 relative to the truck frame 75. The elongated slot 91, rather than a closed circular opening such as is provided in connection with the trunnion 90, is employed to permit the necessary freedom of movement which occurs between the car bodies and the truck frame in negotiating a curve. Trunnions 90 and 92 are secured to the car bodies 71 and 70, respectively, as best shown in Fig. 8 of the drawings. Preferably the opening in the truck frame 75 for receiving the trunnion 90 is provided with a pressed-in rubber bushing 94, while the trunnion 92 is disposed in an open lug defining the slot or notch 91, which is slightly larger than the diameter of the trunnion 92.

When the train comprising the passenger cars having car bodies 70 and 71 moves around a curve, car bodies 70 and 71 turn in regard to the truck frame 75 around the trunnions 90 and 92, respectively. When this occurs, the balls 86 roll in the grooves 85 and cooperating grooves 87. The arcuate construction of these grooves permits the necessary movement. Preferably the grooves 85 and 87 are of a sufficient depth to accommodate about one-quarter of the circumference of the balls or spherical members 86.

Referring now to Fig. 7 of the drawings, the kinematics of the mechanism indicating that means are provided to move the axle 78 through one-half the angular relative movement between car bodies 70 and 71 can readily be understood. To correspond with the preceding embodiment, the coupling pin 74 is designated by the letter A, the trunnion 90 by the letter B, and the trunnion 92 by the letter C. It will be apparent that if the car body 70 pivots about coupling pin 74 through an angle $\alpha$, the trunnion 92 designated as point C must move to a new point designated as C' displaced from original point C by the angle $\alpha$. This requires the truck frame 75 to pivot about point B or the trunnion 90, since trunnion 92 will now be at point C'. From the geometry, it will readily be apparent that the angle through which axle 78 moves is equal to one-half the angle $\alpha$, designated as $$\frac{\alpha}{2}$$

in Fig. 7 of the drawings. With this arrangement, the axis of the axle 78 is moved so as to bisect the angle formed by the longitudinal axes of the car bodies 70 and 71, or, in other words, to maintain the axle 78 on the radius of the curve of the track negotiated by the train. As in the preceding embodiment, preferably shock absorbers or dampeners 95 are provided, one on either side of the car. Telescopic movement of these dampeners prevents horizontal oscillations of the car bodies about the coupling pin 74.

Figure 9:
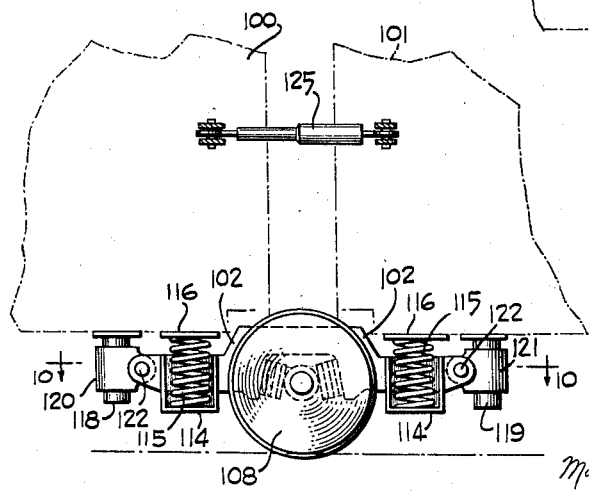
Fig. 9 is a view similar to Fig. 6 illustrating still another modification of the present invention.
Figure 10:
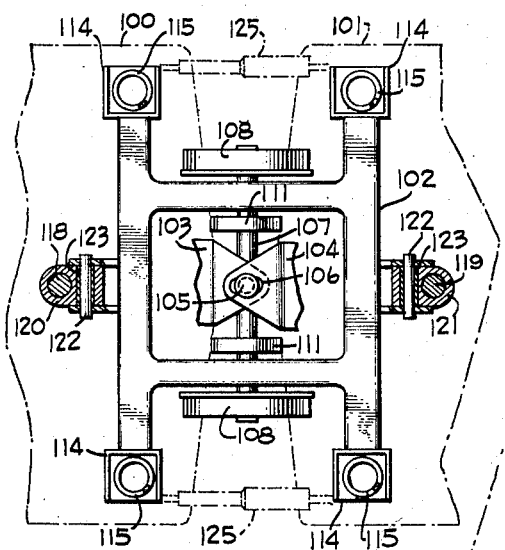
Fig. 10 is a sectional view taken on line 10—10 of Fig. 9.

In Figs. 9 and 10 of the drawings, there is illustrated still another modification of the present invention in which the car bodies 100 and 101 are illustrated as being supported on an H-type truck frame 102. These cars are provided with couplers 103 and 104, respectively, which are connected together by coupling pin 105. In this case the couplers are provided with a lost motion connection such as an elongated slot 106 in at least one of the couplers, the purpose of which will become apparent from the following description. The frame 102 is disposed symmetrically beneath the cars 101 and 102 so that an axle 107 with associated wheels 108 is disposed equidistant between the two cars and beneath the same, as is clearly apparent from Figs. 9 and 10 of the drawings. The axle 107 is provided with conventional brake drums 111, and the wheel and axle assembly is provided with journal boxes which have somewhat the construction of the journal boxes of Fig. 2 of the drawings with the sandwich type of support for the purpose of supporting the car bodies 100 and 101 from the truck frame 102. The latter is provided with spring receiving recesses 114 adjacent each of the four corners thereof to support therein coil springs 115 which engage suitable supporting members 116 secured to the bottom of the car bodies 100 and 101. The construction of the arrangement shown in Figs. 9 and 10 differs from the preceding embodiments in that the journal boxes are what is generally referred to as inboard journal boxes, namely, the boxes being disposed between the two wheels as contrasted with the preceding embodiments wherein the journal boxes are disposed outside the two wheels.

To relate the car bodies 100 and 101 to the truck frame, in addition to the supporting springs 115, there are provided trunnions 118 and 119, respectively, secured to the car bodies 100 and 101. These trunnions are secured to the bottom center of the car bodies and are adapted to be received in cooperating openings defined in lugs 120 and 121, respectively, hinged as by pivot pin means 122 to the car frame 102. The pivot pins 122 are preferably disposed in rubberized bushings 123. The lugs 120 and 121 can slide vertically along the trunnions 118 and 119, respectively, as the springs 115 are deflected. The same hydraulic dampeners as in the preceding embodiments, designated by the reference numeral 125, may be employed.

The operation of the running gear arrangement disclosed in Figs. 9 and 10 will readily be understood and the same mechanical principle as described in detail with reference to Fig. 7 can readily be appreciated with reference to Fig. 10. When the adjacent car bodies 100 and 101 pivot about coupling pin 106 through an angle $\alpha$ relative to each other, the axis of the supporting wheels or the axle 107 will turn through an angle equal to $$\frac{\alpha}{2}$$

and, hence, the axle will remain on the radius of the curve around which the train, including the car bodies 100 and 101, is moving.

Figure 11:
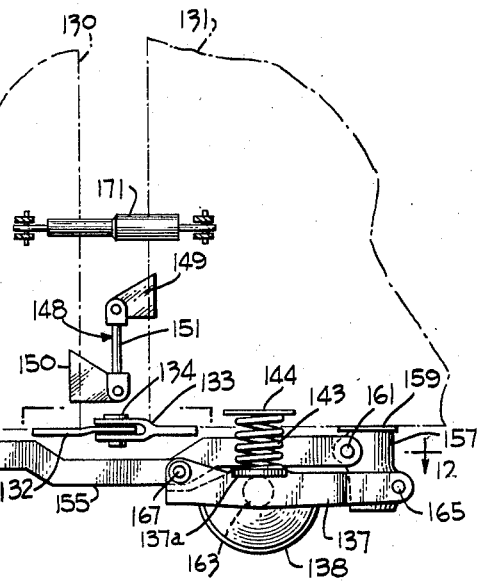
Fig. 11 is a view somewhat similar to Fig. 6 illustrating still another modification of the present invention.
Figure 12:
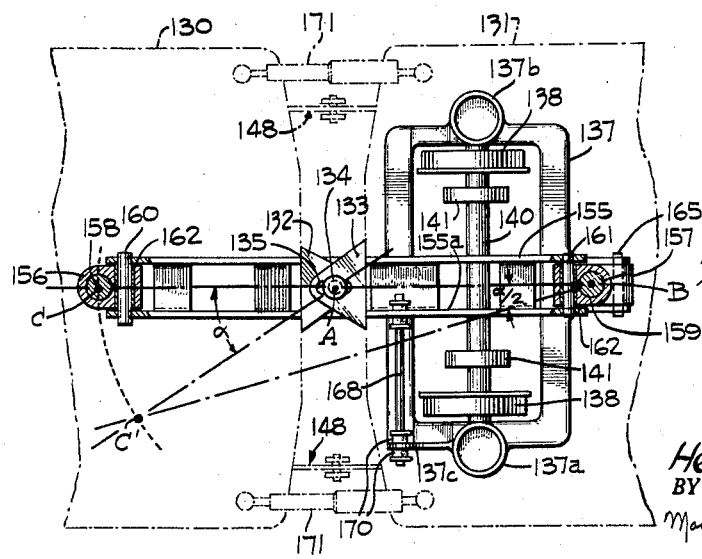
Fig. 12 is a sectional view taken on line 12—12 of Fig. 11.

Although in the above described arrangements the single axle running gear is disposed so that the axle is midway between the adjacent ends of the cars, the present invention is also applicable to arrangements in which the axle is disposed under the end of one of the cars and, hence, somewhat displaced with respect to a point midway between the cars or with respect to the coupling point between the cars. In Figs. 11 and 12 such an arrangement is disclosed which has the advantages of the preceding embodiments and which permits the train to move in either direction with high speed and with very good riding qualities. Referring now to Figs. 11 and 12, there is illustrated schematically a portion of two adjacent cars 130 and 131 which are interconnected by coupling members 132 and 133, respectively, having a coupling pin 134. As in the embodiment of Fig. 10, at least one of the couplers, such as 133, is provided with an elongated slot or opening 135.

For the purpose of supporting the car 131, there is provided a truck illustrated as comprising the conventional rectangular frame 137 with suitable journal boxes for relating to the truck the wheels 138 and the axle 140, which axle may be provided with suitable brake drums 141. The frame is of generally rectangular shape and is provided at the ends thereof above the journal boxes with suitable spring recesses 137a and 137b, one disposed at either side of the car body 131. The car body 131 is, therefore, supported on the truck 137 by means of suitable springs 143 having their lower ends in the spring recesses 137a or 137b and their upper ends engaging suitable supporting members such as 144 secured to the frame of the car body 131. It will be apparent that car body 130 may be supported from car body 131 through the coupler arrangement comprising coupling members 132 and 133, as viewed in Fig. 11 of the drawings. However, it may be desirable to provide an additional suspension means for suspending car body 130 from car body 131, and to this end there is generally indicated at 148 suspension means, one disposed at either side of the car bodies. Each suspension means preferably comprises an upper bracket 149 secured to the car body 131 and a lower bracket 150 secured to the car body 130. The adjacent ends of these brackets are pivotally interconnected by a bar 151 for transferring the weight between car body 130 and car body 131.

In order to provide the guiding arrangement of the present invention for the axle 140, there is suitably secured to the truck frame 137 a center beam 155 which extends longitudinally beneath both car bodies 130 and 131. The center beam 155 has pivotally connected to the ends thereof lugs 156 and 157, which lugs are hinged to trunnions 158 and 159, the trunnion 158 being connected to the bottom of car body 130, and the trunnion 159 being connected to the car body 131. The lugs or collars 156 and 157 are pivoted as by pivot pins 160 and 161, respectively, to the opposite ends of the center beam 155. Preferably the pivot pins are disposed in suitable bushings 162, which may be rubberized bushings. The truck frame 137 is provided with journal box bearings 163 which are supported in the frame ends, and one frame end is hinged to the collar 157 by the pivot means 165, which preferably includes a rubberized bushing not shown. Truck frame 137 is, furthermore, pivoted to the center beam 155 as by pivot pin 167. For the purpose of maintaining the truck frame as more or less of a fixed unit with respect to the center beam 155, the two are interconnected by a rod 168, the ends of which are connected to a flange 155a of the center beam 155, and a flange 137c of the truck frame 137. Suitable interposed rubber washers 170 at either end provide a somewhat resilient connection to transmit forces between the truck frame 137 and the center beam 155. Dampeners 171, identical with those disclosed in preceding embodiments, may be provided interconnecting the ends of the adjacent cars near the outer edges thereof and preferably at about the center of gravity of the car bodies.

In view of the detailed description included above, the operation of the arrangement of Figs. 11 and 12 will readily be understood by those skilled in the art. As in the preceding embodiments designating the coupling point between the cars as point A, the trunnion 159 as point B and the trunnion 158 as point C, it will be apparent that if car bodies 130 and 131 pivot relative to each other, they do so about coupling pin 134 or point A. Considering for the moment that car body 131 remains stationary and that car body 130 pivots relative thereto through an angle α about point A, then the trunnion 158 must move from the point C to the point C'. During this pivotal movement, however, the truck frame 137 pivots about point B, and by simple geometry the angle between the lines BAC and BC' is $$\frac{\alpha}{2}$$

so that angular movement of the truck body is one-half the relative angular displacement of the car bodies.

From the above description it will be apparent that there has been provided a very simple running gear for passenger cars involving a single axle which may be mounted between the two cars or under one car adjacent the other car. A very compact, lightweight construction is provided, and at all times the axle has its axis maintained in a radial position or on the radius of the curve about which the train is moving. If a straight section of track is involved, obviously the radius of the curve is infinite and the axle is parallel with the adjacent car ends.

While there have been illustrated and described several embodiments of the present invention, numerous changes and modifications will occur to those skilled in the art, and it is intended in the appended claims to cover all such changes and modifications as fall within the true spirit and scope of the present invention.

What is claimed as new and desired to be secured by Letters Patent of the United States is:

1. A single axle truck for a railway passenger car of the type comprising at least two car bodies pivotally coupled together at a point between said car bodies on the longitudinal axes of said car bodies, the combination of a truck frame, an axle and associated wheels operatively related to said truck frame for supporting the same, means for supporting the adjacent ends of said two car bodies from said truck frame, and a longitudinally disposed rod one on either side of said frame for interconnecting each car body and said truck frame whereby said axle is always maintained in a radial position and angular movement thereof about a vertical axis is maintained equal to one-half the relative angular movement between the longitudinal axes of said car bodies.

2. A lightweight railway passenger train comprising at least two car bodies pivotally coupled together at a point between said car bodies on the longitudinal axes of said car bodies, a truck frame, an axle and associated wheels operatively related to said truck frame for supporting the same, means for supporting the adjacent ends of said two car bodies from said truck frame for pivotal movement relative thereto, and axle controlling mechanism comprising a first single rigid member connecting said frame and the adjacent end of one of said car bodies, and a second rigid member connecting said frame and the adjacent end of the other of said car bodies, said axle controlling mechanism when said car bodies are disposed on a curved track section maintaining said axle in a position parallel to the bisector of the angle defined between the adjacent ends of said car bodies.

3. The passenger train of claim 2 wherein said first single rigid member comprises a rod interconnecting one side of the adjacent end of one of said car bodies to the corresponding end of said truck frame and said second rigid member comprises a second rod interconnecting the adjacent end of the opposite side of the other of said car bodies to the other end of said truck frame, said rods having their longitudinal axes extending generally in the direction of the longitudinal axes of said car bodies.

4. The running gear of claim 3 wherein said rods are parallel to each other and of the same length.

5. The running gear of claim 4 wherein a third rod is provided of the same length as the other rods and parallel thereto connected between one of said car bodies and the end of said frame to which one of said other rods connected to the same car body is connected, said rod being vertically displaced with respect to the other rods.

6. The running gear of claim 2 in which said car bodies are supported from said truck frame on vertically extending springs, and means for maintaining said springs in the vertical position regardless of the angular position of said car bodies.

7. The running gear of claim 6 wherein the particular side of each car body connected to said truck frame by one of said rods is supported directly on a spring resting on said truck frame.

8. The running gear of claim 6 wherein means are provided to limit the lateral forces to which said springs are subjected.

9. A single axle truck for a railway passenger car of the type comprising at least two car bodies pivotally coupled together at a point between said car bodies on the longitudinal axes of said car bodies for pivotal movement about a first vertical axis, the combination of a truck frame, an axle and associated wheels operatively related to said truck frame for supporting the same, means for supporting the adjacent ends of said two car bodies from said truck frame, means including a first fixed trunnion secured to one of said two car bodies for pivotally connecting said truck frame to one of said car bodies for pivotal movement about a second vertical axis, and means including a second fixed trunnion secured to the other of said two car bodies for rotatively connecting the other of said car bodies to said truck frame for limited angular movement about a third vertical axis, at least one of said last two mentioned means including a cooperating trunnion receiving member which with the associated trunnion define a fixed pivot between said frame and the associated one of said car bodies, said three vertical axes being spaced from each other and disposed along the longitudinal axes of said car bodies when said longitudinal axes are in parallel relationship whereby said axle is always maintained in a radial position relative to the track upon which said truck is mounted and angular movement thereof about a vertical axis is maintained equal to one-half the relative angular movement between the longitudinal axes of said car bodies.

10. The single axle truck of claim 9 wherein said axle is disposed directly beneath said first vertical axis.

11. The single axle truck of claim 9 wherein said axle is disposed in a plane extending between said first and second vertical axis.

References Cited in the file of this patent

UNITED STATES PATENTS

| | | |
|---|---|---|
| 1,388,508 | Brilhart | Aug. 23, 1921 |
| 1,408,167 | Brilhart | Feb. 28, 1922 |
| 1,417,135 | Brilhart | May 23, 1922 |
| 2,605,718 | Omar et al. | Aug. 5, 1952 |

FOREIGN PATENTS

| | | |
|---|---|---|
| 512,263 | Belgium | July 15, 1952 |
| 484,258 | Germany | Oct. 14, 1929 |
| 552,538 | Germany | June 15, 1932 |
| 469,916 | Italy | Mar. 17, 1952 |